United States Patent
Lockhart

(10) Patent No.: US 12,459,319 B2
(45) Date of Patent: Nov. 4, 2025

(54) REAR TOE LINK INCLUDING INNER BALL JOINT WITH PRESS-FIT STUD

(71) Applicant: GM GLOBAL TECHNOLOGY OPERATIONS LLC, Detroit, MI (US)

(72) Inventor: Collin R. Lockhart, Waterford, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 313 days.

(21) Appl. No.: 18/316,019

(22) Filed: May 11, 2023

(65) Prior Publication Data

US 2024/0375468 A1  Nov. 14, 2024

(51) Int. Cl.
*B60G 7/00* (2006.01)
*F16C 11/06* (2006.01)

(52) U.S. Cl.
CPC .......... *B60G 7/005* (2013.01); *F16C 11/0623* (2013.01); *F16C 11/0695* (2013.01); *B60G 2204/416* (2013.01)

(58) Field of Classification Search
CPC .............. F16C 11/0614; F16C 11/0623; F16C 11/0628; F16C 11/0642; F16C 11/069; F16C 2326/05; F16C 11/0695; B60G 7/005; B60G 2204/416
See application file for complete search history.

(56) References Cited

U.S. PATENT DOCUMENTS

| | | | | | |
|---|---|---|---|---|---|
| 1,829,964 | A | * | 11/1931 | Randall | F16C 11/0619 139/59 |
| 3,497,247 | A | * | 2/1970 | Fister | F16C 11/0676 403/133 |
| 3,849,009 | A | * | 11/1974 | Bourdon | F16C 11/0633 403/133 |
| 3,950,006 | A | * | 4/1976 | Wood, Jr. | B62D 3/12 280/93.511 |
| 4,187,033 | A | * | 2/1980 | Zukowski | F16C 11/0647 280/93.511 |
| 4,193,707 | A | * | 3/1980 | Doden | F16C 11/0642 403/135 |
| 4,311,405 | A | * | 1/1982 | Hawley | F16C 11/0623 403/164 |
| 4,478,531 | A | * | 10/1984 | Levinson | B62D 7/18 403/77 |
| 4,650,363 | A | * | 3/1987 | Kehl | F16C 11/069 403/135 |
| 4,679,959 | A | * | 7/1987 | Cavallaro | F16C 11/069 403/317 |
| 4,764,048 | A | * | 8/1988 | Kehl | F16C 11/069 403/326 |

(Continued)

FOREIGN PATENT DOCUMENTS

GB 2108196 A * 5/1983 .......... F16C 11/0623

*Primary Examiner* — Amber R Anderson
*Assistant Examiner* — Kevin J Baynes

(57) ABSTRACT

A ball joint for a rear toe link includes a ball joint housing including a cylindrical wall, a first surface extending between the cylindrical wall at a first end thereof, and a bore in the first surface. A stud includes a head, a shoulder extending from the head, and a shaft extending from the shoulder. The shoulder is inserted into the bore in the first surface of the ball joint housing and the head is arranged adjacent to an inner side of the first surface. A ball/rod portion includes a ball and a rod extending from the ball.

16 Claims, 4 Drawing Sheets

(56) References Cited

U.S. PATENT DOCUMENTS

| | | | | |
|---|---|---|---|---|
| 5,116,159 | A * | 5/1992 | Kern, Jr. | F16C 11/0642 29/898.047 |
| 5,522,281 | A * | 6/1996 | Herman | F16C 7/06 384/276 |
| 5,529,316 | A * | 6/1996 | Mattila | B62D 17/00 280/93.511 |
| 5,704,726 | A * | 1/1998 | Nemoto | F16C 11/0652 403/132 |
| 5,799,968 | A * | 9/1998 | Loeffler | B60G 7/005 403/143 |
| 6,164,860 | A * | 12/2000 | Kondo | B62D 7/22 403/56 |
| 6,250,840 | B1 * | 6/2001 | Urbach | F16C 11/0642 403/135 |
| 6,386,564 | B1 * | 5/2002 | Kincad | B62D 17/00 280/93.511 |
| 6,612,594 | B2 * | 9/2003 | Engels | B62D 7/16 280/93.502 |
| 6,655,704 | B2 * | 12/2003 | McNalley | B62D 7/16 403/315 |
| 7,040,812 | B2 * | 5/2006 | Boshier | F16C 11/068 384/192 |
| 7,644,500 | B2 * | 1/2010 | Schmidt | F16C 11/0685 29/898.044 |
| 8,870,201 | B2 * | 10/2014 | Kuroda | B29C 45/14008 280/93.511 |
| 9,790,983 | B2 * | 10/2017 | Kopsie | F16C 11/0695 |
| 9,982,711 | B1 * | 5/2018 | Henriksen | F16C 11/0642 |
| 10,668,781 | B2 * | 6/2020 | Yu | F16C 11/00 |
| 11,460,068 | B2 * | 10/2022 | Kuroda | F16C 11/0633 |
| 2020/0023897 | A1 * | 1/2020 | Seo | F16C 11/0642 |

* cited by examiner

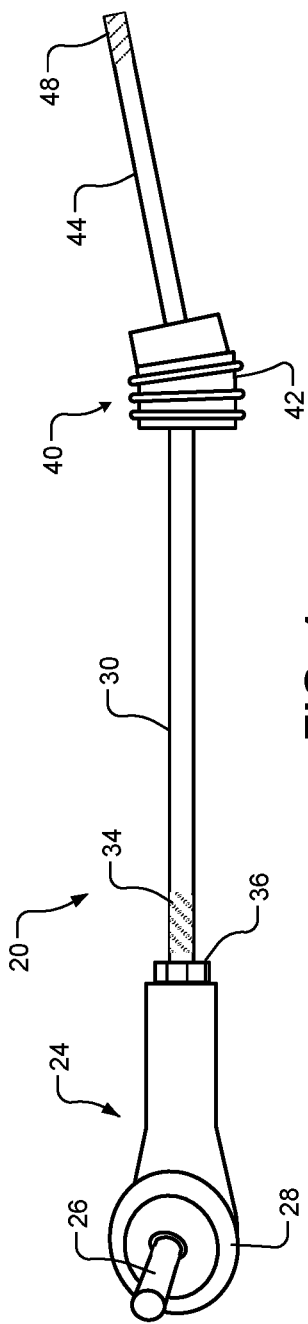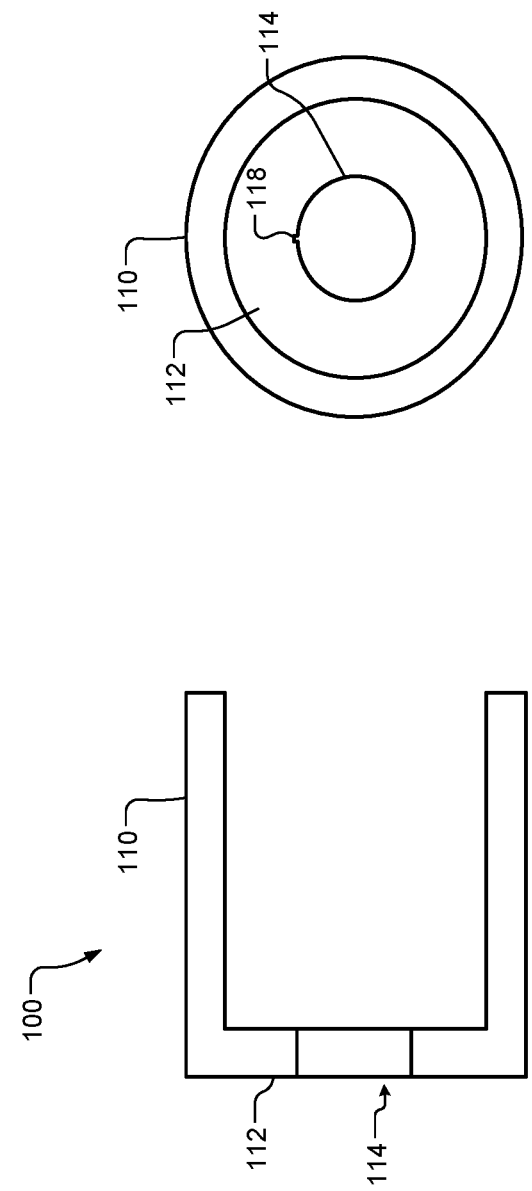

REAR TOE LINK INCLUDING INNER BALL JOINT WITH PRESS-FIT STUD

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to toe links, and more particularly to an inner ball joint for a rear toe link.

Vehicles include a steering wheel that is connected to a steering rack. Front tie rods are used to connect the steering rack to front hubs. The front hubs are typically connected to control arms of a front suspension. Front wheels are mounted on the hubs. When the steering wheel is stationary, the steering rack and the tie rods maintain the position of the wheels. As the steering wheel is turned, the steering rack moves the front tie rods, which changes a direction of the hub and front wheels to steer the vehicle.

Some vehicles may also be optioned with or without a rear wheel steering system. When optioned with the rear wheel steering system, a rear wheel steering gear is connected by rear tie rods to rear hubs of the vehicle. When the vehicle is moving at low speeds, the front wheels turn in the direction of travel while the rear wheels are turned in the opposite direction to effectively reduce a turning radius of the vehicle and/or improve low-speed maneuverability. Rear wheel steering at higher speeds turns both the front and rear wheels in the same direction for increased high-speed stability.

When the vehicle is optioned with the rear wheel steering system, the rear tie rods include an inner ball joint having a relatively short stud connected to the rear wheel steering gear. The inner ball joint with the relatively short stud can be manufactured using a single component. However, when the vehicle is optioned without the rear wheel steering system, the inner ball joint of a rear toe link needs to have a longer stud to connect to a cradle/frame.

SUMMARY

A ball joint for a rear toe link includes a ball joint housing including a cylindrical wall, a first surface extending between the cylindrical wall at a first end thereof, and a bore in the first surface. A stud includes a head, a shoulder extending from the head, and a shaft extending from the shoulder. The shoulder is inserted into the bore in the first surface of the ball joint housing and the head is arranged adjacent to an inner side of the first surface. A ball/rod portion includes a ball and a rod extending from the ball.

In other features, a molded insert is arranged in the ball joint housing between the ball of the ball/rod portion and the head of the stud. The ball of the ball/rod portion is arranged inside of the ball joint housing and the rod of the ball/rod portion extends outside of the ball joint housing. A second end of the cylindrical wall extends inwardly around the ball of the ball/rod portion. A portion of an outer surface of the shoulder is knurled.

In other features, an outer surface of the shoulder includes one or more splines. In other features, the bore in the first surface includes one or more slots to receive the one or more splines, respectively. The ball joint housing and the stud are made of steel.

A rear toe link comprises the ball joint and an outer ball joint attached to the rod of the ball/rod portion. A distal end of the shaft is threaded for connection to a cradle/frame.

A method for manufacturing a ball joint for a rear toe link includes providing a ball joint housing including a cylindrical wall, a first surface extending between the cylindrical wall at a first end thereof, and a bore in the first surface; providing a stud including a head, a shoulder extending from the head, and a shaft extending from the shoulder; and press fitting the shoulder of the stud into the bore in the first surface of the ball joint housing with the head arranged adjacent to an inner side of the first surface.

In other features, the method include arranging a molded insert in the ball joint housing between the ball and the head of the stud. The method include arranging a ball of a ball/rod portion into the ball joint housing with a rod of the ball/rod portion extending outside of the ball joint housing. The method includes rolling an edge of the cylindrical wall around the ball of the ball/rod portion. The method includes knurling a portion of an outer surface of the shaft.

In other features, the method includes arranging one or more splines on a portion of an outer surface of the shaft. The method includes forming one or more slots in the bore in the first surface to receive the one or more splines, respectively. The ball joint housing and the stud are made of steel.

A rear toe link comprises an inner ball joint including a ball joint housing including a cylindrical wall, a first surface extending between the cylindrical wall at a first end thereof, and a bore in the first surface. A stud includes a head, a shoulder extending from the head, and a shaft extending from the shoulder. The shoulder is inserted into the bore in the first surface of the ball joint housing with the head adjacent to an inner side of the first surface. A ball/rod portion includes a ball and a rod extending from the ball. The ball of the ball/rod portion is arranged inside of the ball joint housing and the rod extends outside of the ball joint housing, and wherein a second end of the cylindrical wall curves inwardly around the ball. A molded insert is arranged in the ball joint housing between the ball and the head of the stud. An outer ball joint is attached to the rod of the ball/rod portion.

In other features, an outer surface of the shoulder is knurled. A portion of an outer surface of the shoulder includes one or more splines. The bore in the first surface includes one or more slots to receive the one or more splines, respectively. The ball joint housing and the stud are made of steel.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 1 is a side view of an example of a rear toe link including an inner ball joint according to the present disclosure;

FIG. 2A is a side cross sectional view of an example of a ball joint housing of the inner ball joint according to the present disclosure;

FIG. 2B is a plan view of the ball joint housing of the inner ball joint according to the present disclosure;

In the drawings, reference numbers may be reused to identify similar and/or identical elements.

DETAILED DESCRIPTION

Figure 3C:
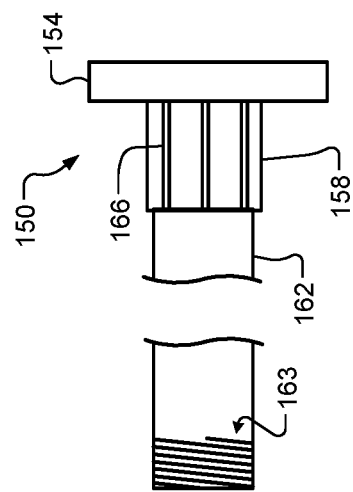
FIG. 3C is a side view of an example of a stud with splines according to the present disclosure.

When the vehicle is optioned without a rear wheel steering system, the inner ball joint of a rear toe link includes a long threaded stud to connect to a cradle/frame. Manufacturing a single-piece inner ball joint with a threaded stud that is long enough for non-steered applications is not feasible. Therefore, the inner ball joint for the rear toe link may be welded using two components or manufactured using a threaded-on two-piece design. However, prior welded or two-piece designs for the inner ball joint have had issues with strength, cost, and/or mass.

The present disclosure relates to a tie rod style inner ball joint for a non-steered toe link. The inner ball joint is made using a press-fit two-piece design that is sufficiently strong and less expensive than other welded or threaded-on two-piece designs.

The two-piece design described further below provides sufficient stud length for a good joint (i.e., bolt stretch) to the cradle/frame, avoids warping, quality issues, and/or costs associated with a welded design, and is more cost-effective than prior threaded-on two-piece designs.

An inner ball joint for a toe link according to the present disclosure includes a ball joint housing and a stud. The stud includes a head, a shoulder, and a threaded shaft extending from the shoulder. In some examples, an outer surface of the shoulder of the stud between the head and the shaft includes splines or knurling to provide light press-fit with a bore in the ball joint housing.

To manufacture the inner ball joint, a ball joint housing is manufactured with cylindrical walls. A first surface extends between the cylindrical walls and includes a bore. The bore is sized to fit the shoulder of the stud. The stud is inserted through the bore in the ball joint housing. In some examples, the shoulder of the stud is press-fit into the bore of ball joint housing using an arbor until the head is seated against an inner side of the first surface of the ball joint housing.

In some examples, a molded insert and a ball of a ball/rod portion are arranged in the ball joint housing. Then, a rolling operation is performed to bend/curve the cylindrical wall of the ball joint housing to retain the ball in the ball joint housing. When the stud is press-fit into the ball joint housing, a mechanical interlock is formed to retain the ball of the ball/rod portion securely under high loading conditions. The inner ball joint according to the present disclosure is both strong and inexpensive to manufacture.

Referring now to FIG. 1, a toe link 20 includes an outer ball joint 24 including a rod 26 and an optional rubber boot 28. The outer ball joint 24 is connected to a rod 30 including threads 34 and a nut 36. The rod 30 extends to an inner ball joint 40 including an optional rubber boot 42. A threaded rod 44 extends from the inner ball joint 40 to a cradle/frame. In some examples, ends of the threaded rod 44 include threads 48.

Referring now to FIGS. 2A and 2B, the inner ball joint 40 includes a ball joint housing 100 with a cylindrical side wall 110 and a first surface 112 extending between the cylindrical side wall 110 at one end. The first surface 112 includes a bore 114. In some examples, the bore 114 may optionally include one or more slots 118 to receive a spline as shown in FIG. 2B. In other examples, the splines are used without slots in the bore 114.

Figure 3B:
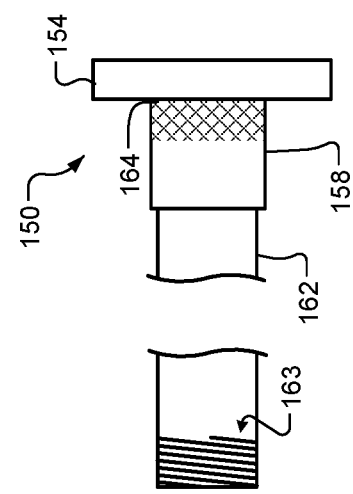
FIG. 3B is a side view of an example of a stud with a shoulder including a knurled surface according to the present disclosure.
Figure 3A:
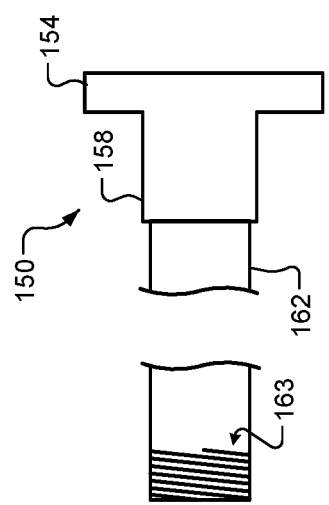
FIG. 3A is a side cross sectional view of an example of a stud according to the present disclosure.

Referring now to FIGS. 3A to 3C, a stud 150 includes a head 154, a shoulder 158, and a shaft 162. In some examples, the head 154 has a larger diameter than the shoulder 162. In some examples, the head 154 and the shoulder 162 have a "T"-shaped cross section. In some examples, the shaft 162 has a smaller diameter than the shoulder 158 to allow the shaft 162 to be easily inserted through the bore 114 and the shoulder 158 to be press fit into the bore 114. A distal end of the shaft 162 includes threads 163. In FIG. 3B, an outer surface of the shoulder 158 of the stud 150 includes a knurled surface 164. In FIG. 3C, an outer surface of the shoulder 158 may include one or more splines 166. In some examples, the one or more splines 166 are received by the one or more slots 118 in the bore 114 in the ball joint housing 100. In other examples, the one or more splines 166 are not used with slots.

Figure 4:
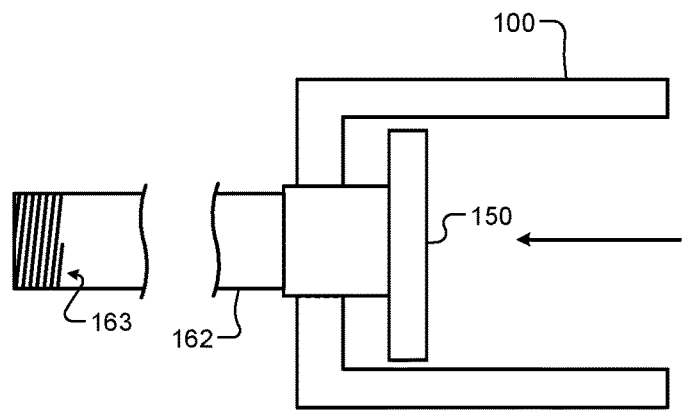
FIG. 4 illustrates insertion of the stud into the ball joint housing according to the present disclosure.
Figure 5A:
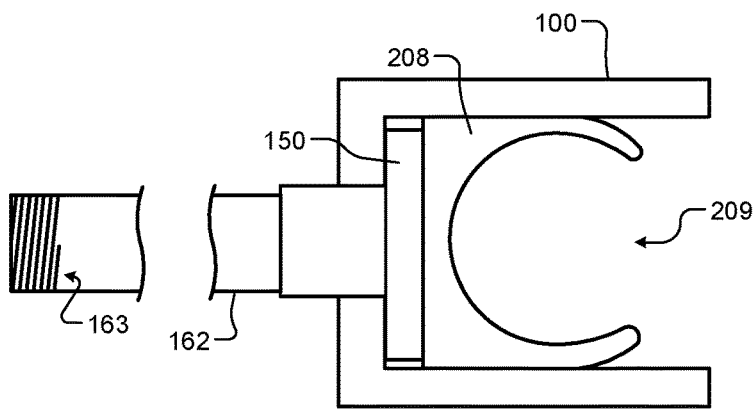
FIG. 5A illustrates insertion of a molded insert into the ball joint housing according to the present disclosure.
Figure 5B:
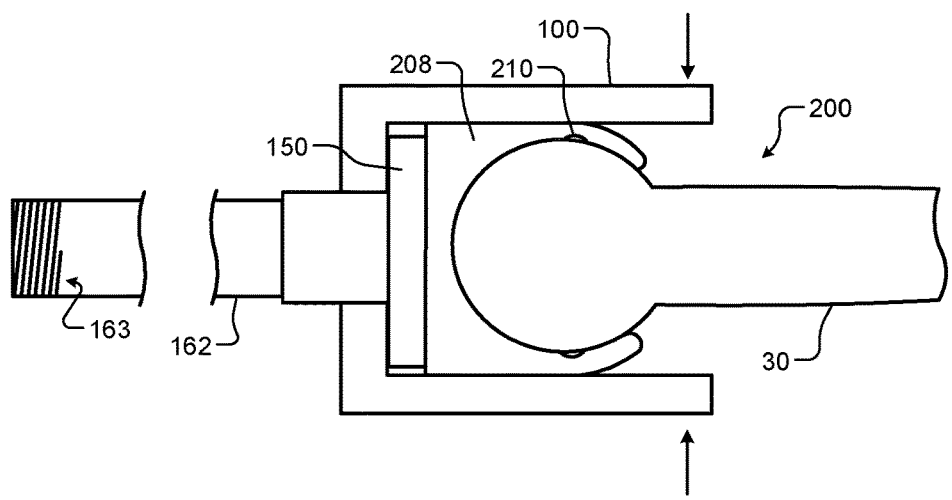
FIG. 5B illustrates insertion of a ball of a ball/rod portion into the ball joint housing and pressing of an edge of the ball joint housing according to the present disclosure.
Figure 6:
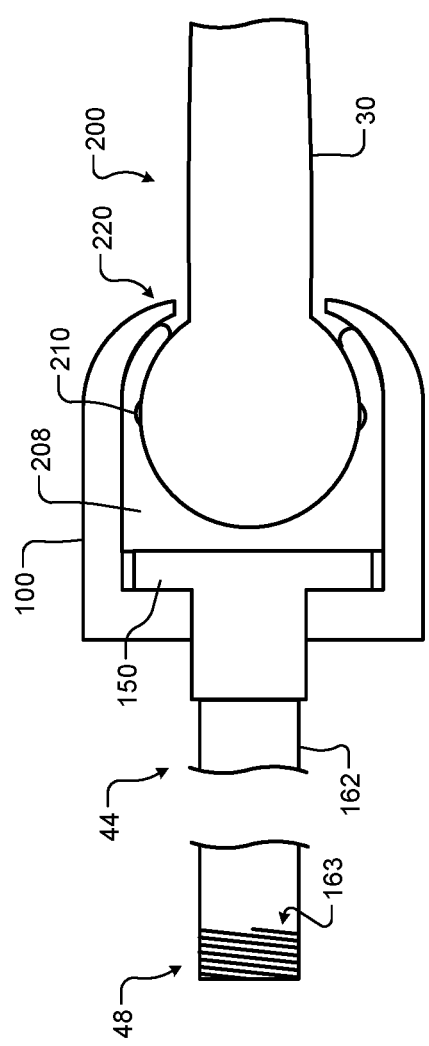
FIG. 6 illustrating an example of the inner ball joint according to the present disclosure.

Referring now to FIGS. 4 to 6, manufacturing of the inner ball joint is shown. In FIG. 4, the stud 150 is inserted into the ball joint housing 100. The shaft 162 is inserted through the bore 114 in the ball joint housing 100 and the shoulder 158 is press fit into the bore 114. For example, an arbor may be used to press fit the stud 150 into the bore 114.

In FIG. 5A, a molded insert 208 is arranged in the ball joint housing 100 to prevent in/out movement of a ball/rod portion 200 (FIGS. 5B and 6) during use. In some examples, the molded insert 208 is made of plastic such as polyoxymethylene (POM), although other materials can be used. In some examples, the molded insert 208 includes an opening 209 to receive the ball of the ball/rod portion 200. In some examples, the ball may optionally include a bearing 210 to reduce friction.

In FIG. 5B, the ball/rod portion 200 is inserted into the molded insert 208 and the ball joint housing 100. In FIGS. 5B and 6, an edge of a cylindrical wall of the ball joint housing 100 is pressed or rolled inwardly as shown at edge 220 to retain the ball of the ball/rod portion 200 inside of the ball joint housing 100. In other words, the edge 220 has a diameter smaller than the ball after rolling to retain the ball in the ball joint housing 100.

In some examples, the ball joint housing 100 and the stud 150 are made of steel. In some examples, the ball joint housing 100 and the stud 150 are made of 10.9 grade hardened steel. In some examples, grease is applied to the ball of the ball/rod portion 200 and/or other components prior to insertion.

The two piece ball joint design for a toe link is strong, low cost, and allows a longer threaded rod to be used. The two piece design avoids warping that may occur when welding is used. The mechanical interlock provided by the housing and the shoulder of the stud is capable of withstanding high tensile and compression loading.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

What is claimed is:

1. A ball joint for a rear toe link, comprising:
   a ball joint housing including a cylindrical wall, a first surface extending orthogonally between the cylindrical wall at a first end thereof, and a bore positioned centrally in the first surface;
   a stud including a head, a shoulder extending from the head, and a shaft extending from the shoulder, the head having a first diameter, the shoulder having a second diameter that is smaller than the first diameter, and the shaft having a third diameter that is smaller than the second diameter;
   wherein the shoulder is inserted into the bore in the first surface of the ball joint housing and the head is arranged adjacent to an inner side of the first surface;
   a ball assembly including a ball and a rod extending from the ball, the ball being arranged in the ball joint housing and the rod extending outside of the housing; and
   a molded insert arranged in the ball joint housing between the ball of the ball assembly and the head of the stud, the molded insert including a base that forms a barrier between the ball of the ball assembly and the head of the stud.

2. The ball joint of claim 1, wherein a second end of the cylindrical wall extends inwardly around the ball of the ball assembly ball/rod portion.

3. The ball joint of claim 1, wherein a portion of an outer surface of the shoulder is knurled.

4. The ball joint of claim 1, wherein an outer surface of the shoulder includes one or more splines.

5. The ball joint of claim 1, wherein the ball joint housing and the stud are made of steel.

6. A rear toe link comprising:
   the ball joint of claim 1; and
   an outer ball joint attached to the rod of the ball assembly, wherein a distal end of the shaft is threaded for connection to one of a cradle and a frame.

7. A method for manufacturing a ball joint for a rear toe link, comprising:
   providing a ball joint housing including a cylindrical wall, a first surface extending orthogonally between the cylindrical wall at a first end thereof, and a bore arranged centrally in the first surface;
   providing a stud including a head, a shoulder extending from the head, and a shaft extending from the shoulder, the head having a first diameter, the shoulder having a second diameter that is smaller than the first diameter, and the shaft having a third diameter that is smaller than the second diameter;
   press fitting the shoulder of the stud into the bore in the first surface of the ball joint housing with the head arranged adjacent to an inner side of the first surface;
   arranging a ball of a ball assembly in the ball joint housing, a rod of the ball assembly extending from the housing; and arranging a molded insert in the ball joint housing between the ball of the ball assembly and the head of the stud, the molded insert including a base that forms a barrier between the ball of the ball assembly and the head of the stud.

8. The method of claim 7, further comprising rolling an edge of the cylindrical wall around the ball of the ball assembly.

9. The method of claim 7, further comprising knurling a portion of an outer surface of the shaft.

10. The method of claim 7, further comprising arranging one or more splines on a portion of an outer surface of the shaft.

11. The method of claim 10, further comprising forming one or more slots in the bore in the first surface to receive the one or more splines, respectively.

12. The method of claim 7, wherein the ball joint housing and the stud are made of steel.

13. A rear toe link comprising:
   an inner ball joint comprising:
      a ball joint housing including a cylindrical wall, a first surface extending orthogonally between the cylindrical wall at a first end thereof, and a bore arranged centrally in the first surface;
      a stud including a head, a shoulder extending from the head, and a shaft extending from the shoulder, the head having a first diameter, the shoulder having a second diameter that is smaller than the first diameter, and the shaft having a third diameter that is smaller than the second diameter,
      wherein the shoulder is inserted into the bore in the first surface of the ball joint housing with the head adjacent to an inner side of the first surface;

a ball assembly including a ball and a rod extending from the ball, wherein the ball of the ball assembly is arranged inside of the ball joint housing and the rod extends outside of the ball joint housing, and wherein a second end of the cylindrical wall curves inwardly around the ball; and a molded insert arranged in the ball joint housing between the ball and the head of the stud, the molded insert including a base that forms a barrier between the ball of the ball assembly and the head of the stud; and an outer ball joint attached to the rod of the ball assembly.

14. The rear toe link of claim 13, wherein a portion of an outer surface of the shoulder is knurled.

15. The rear toe link of claim 13, wherein:

a portion of an outer surface of the shoulder includes one or more splines, and the bore in the first surface includes one or more slots to receive the one or more splines, respectively.

16. The rear toe link of claim 13, wherein the ball joint housing and the stud are made of steel.

\* \* \* \* \*